United States Patent Office 2,727,873
Patented Dec. 20, 1955

2,727,873

COPOLYMERS OF VINYL ESTERS OF STABILIZED ROSIN ACIDS AND VINYL CHLORIDE AND PROCESS THEREFOR

Walter S. Ropp, Wilmington, Del., assignor to Hercules Powder Company, Wilmington, Del., a corporation of Delaware No Drawing. Application September 27, 1951, Serial No. 248,669

12 Claims. (Cl. 260—27)

This invention relates to new polymeric materials and, more particularly, to copolymers of vinyl chloride and a vinyl ester of a chemically stabilized rosin acid. It also relates to a process for the preparation thereof.

Copolymers of the vinyl ester of rosin and vinyl chloride have been suggested. U. S. 2,118,864, for example, states in its broad disclosure that such copolymers may be formed. No instance of the actual preparation of such a copolymer has been found in the literature, however. One reason is the fact that the vinyl ester of rosin is exceedingly sluggish in polymerization with vinyl chloride. Very strenuous polymerization conditions must be used and even then only low yields of low molecular weight compounds are obtained. Moreover, the copolymers of the vinyl ester of rosin with vinyl chloride are characterized by poor color, low solution viscosity, and low softening point.

It has now been found unexpectedly that the vinyl esters of a rosin acid wherein the rosin acid radical is stabilized chemically have quite different properties as compared with the vinyl esters of rosin in forming copolymers with vinyl chloride. Chemical stabilization as used herein includes both hydrogenation and dehydrogenation. Both of these treatments as applied to rosin and certain rosin compounds are well known to the art. The vinyl esters of rosin with which this invention is concerned are accordingly the vinyl esters of a hydrogenated rosin acid and the vinyl esters of a dehydrogenated rosin acid.

According to this invention, it has been found that vinyl esters of chemically stabilized rosin acids copolymerize with vinyl chloride in the presence of a peroxide catalyst with ease as compared with the related vinyl ester of rosin and vinyl chloride. The vinyl esters of at least 80% hydrogenated rosin acids can be copolymerized with vinyl chloride in substantial yield using peroxide polymerization catalysts such as benzoyl peroxide. When the vinyl ester of rosin is used as one of the monomers, it is practically unaffected by peroxide polymerization catalysts of the type of benzoyl peroxide. Regardless of the polymerization conditions, the copolymers of the invention have substantially higher molecular weights than do copolymers prepared from the vinyl ester of rosin and vinyl chloride under identical conditions. Other advantageous properties are higher softening point, better initial color, better color retention, and higher solution viscosity.

The copolymers of vinyl esters of chemically stabilized rosin acid and vinyl chloride are formed by contacting the monomers with a catalyst which produces free radicals. The copolymerization is preferably effected by contacting the desired monomers with a peroxide polymerization catalyst at a suitable temperature. Alternatively, free radical producing compounds such as $\alpha,\alpha'$-azobisisobutyronitrile, diazoaminobenzene, etc. may be used at a suitable temperature instead of a peroxide catalyst. Another effective procedure involves subjecting the desired monomers to ultraviolet light with or without the use of a suitable activator such as biacetyl, acetone, etc.

The following examples illustrate the preparation of the copolymers of vinyl esters of chemically stabilized rosin acids and vinyl chloride in accordance with this invention. They should not be considered as limiting the invention, however, but merely as specific embodiments of the broad concept. All parts are by weight unless otherwise specified.

EXAMPLE 1

A solution was prepared containing 12.5 parts of sodium lauryl sulfate, 3.05 parts of primary potassium phosphate and 31 parts of an aqueous 0.437 normal solution of sodium hydroxide, all dissolved in 410 parts of water. In a glass polymerization vessel were placed 92 parts of this solution. To this were added 5 parts of an aqueous solution of potassium persulfate containing 0.15 part of potassium persulfate, 10 parts of the vinyl ester of 97% hydrogenated rosin and an amount of vinyl chloride in excess of 40 parts. The excess vinyl chloride was boiled out to displace air and the vessel sealed with a cap containing a Buna N liner. The vessel was then rotated in a bath at 40° C. for 47 hours. The product was isolated by precipitation from 200 parts of ethanol. It was then washed first with 200 parts of ethanol and then three times with 450 parts of an ethanol-water mixture containing 200 parts of ethanol to 250 parts of distilled water. The polymer was sucked dry on the filter and dried for 24 hours at room temperature under a pressure of 15 mm. Hg absolute pressure and finally to approximately constant weight at 1 mm. Hg absolute pressure. The conversion to polymer was 89%. The polymer was milled with di-(2-ethylhexyl) phthalate to yield sheets similar to, but slightly softer than, a control prepared from polyvinyl chloride. The copolymer exhibited the insolubility in common solvents characteristic of polyvinyl chloride, but in contrast to polyvinyl chloride it was swelled by a number of solvents including common plasticizers and was more easily milled than the polyvinyl chloride.

EXAMPLE 2

Into a glass vessel were measured 22.5 parts of vinyl ester of a 97% hydrogenated rosin, 0.7 part of benzoyl peroxide and an excess of vinyl chloride over 118.5 parts. The excess vinyl chloride was boiled out to displace air and the vessel sealed with a cap containing a Buna N liner. It was rotated in a bath at 38° C. for 19 hours. The contents of the vessel were practically solid. The excess vinyl chloride was bled off. The polymer was stirred with 550 parts of ethanol, filtered, and washed on the filter with 240 parts of ethanol. The polymer was dried under vacuum as in Example 1. The conversion to polymer was 15%. The specific viscosity of a 1% solution of the polymer in cyclohexanone was 1.099. The copolymer contained 82% vinyl chloride as determined by chlorine analysis. This polymer was suitable for milling with stabilizers and plasticizers to form soft, elastic sheets.

EXAMPLE 3

A glass vessel was charged with 2 parts of benzoyl peroxide and 60 parts of the vinyl ester of a 97% hydrogenated rosin. The vessel was chilled overnight at approximately −15° C. Slightly over 240 parts of vinyl chloride was added and the vessel was sealed with a cap containing a Buna N liner. The vessel was shaken to obtain a homogeneous solution, and the excess vinyl chloride over 240 g. bled off. The vessel was placed in a bath at 15° C. and tumbled while the bath was warmed to 30° C. over a period of 2¼ hours. The tumbling and heating were continued for 47.5 hours. The vessel was chilled to −15° C. before opening. The polymer was transferred into a vessel containing 570 parts of ether. The polymer was filtered and stirred in a Waring Blendor with 630 parts of isopropyl alcohol and twice with 480 parts of methanol. The solid each time was separated by filtration. The polymer was dried under vacuum as in Example 1. The conversion to polymer was 31%. The polymer contained 88.9% vinyl chloride as determined by chlorine analysis. This copolymer showed improved compatability with several plasticizers. The compatibility of this copolymer and the compatibility of polyvinyl chloride in equivalent formulations are compared in the following table:

*Table I*

| Resin: | | | | |
|---|---|---|---|---|
| Homopolymer (polyvinyl chloride) | 50 | | 50 | |
| Copolymer of Example 3 | | 50 | | 50 |
| Plasticizer: | | | | |
| 70 parts chlorinated paraffin to 30 parts di-(2-ethylhexyl) phthalate | 30 | 30 | | |
| Diethylene glycol dicaprate | | | 30 | 30 |
| Stabilizer: | | | | |
| Lead orthosilicate coprecipitated with silica gel [1] | | | 1 | 1 |
| Dibasic lead phosphite [2] | 4 | 4 | | |
| Dibasic lead stearate [3] | 0.5 | 0.5 | | |
| Property: Exudation | Yes | No | Yes | No |

[1] Sold by National Lead Products Co. under the trade name of "Plumb-O-Sil B."
[2] Sold by National Lead Products Co. under the trade name of "Dyphos."
[3] Sold by National Lead Products Co. under the trade name of "DS 207."

EXAMPLE 4

Into a glass polymerization vessel were measured 375 parts of the vinyl ester of a 97% hydrogenated rosin and a quantity of vinyl chloride in excess of 375 parts. 3.75 parts of benzoyl peroxide was added. The excess vinyl chloride was boiled out to displace air and the vessel sealed with a cap containing a Buna N liner. The vessel was kept at 20° to 25° C. for 138 hours. The product was precipitated from 6000 parts of ethanol. It was dissolved in 600 parts of methyl ethyl ketone and reprecipitated from 1200 parts of rapidly stirred ethanol. The product was dried under vacuum as in Example 1. The conversion to polymer was 12%. The specific viscosity of a 1% solution of the resin in methyl ethyl ketone was 0.348. The polymer contained 49% vinyl chloride as determined by chlorine analysis.

This polymer was dissolved in methyl ethyl ketone and plasticized with di-(2-ethylhexyl) phthalate. Films were cast on glass and dried for 24 hours at room temperature. The films were stripped and dried for 24 hours at 70° C. After conditioning 24 hours at 77° F. and 50% relative humidity, tensile strength strips were cut 0.5 inch wide and tested on the Scott IP-4 tester. The film thickness was 4.2 mils. The composition of the solution from which the films were cast and the properties of the cast films are given in the following table:

*Table II*

| Polymer (parts) | Methyl Ethyl Ketone (parts) | Di-(2-ethylhexyl) Phthalate (parts) | Tensile (lb./sq. in.) | Elongation (percent) |
|---|---|---|---|---|
| 15 | 22.5 | 1.5 | 2,770±90 | 330±10 |
| 13.2 | 19.8 | 0.0 | 4,400±200 | 4.7±0.7 |

With the exception of Example 1, the conditions of polymerization were regulated to limit the conversion to polymer. This permitted obtaining the polymer in a form which was more easily worked with the available laboratory equipment. If higher conversions are desired under the conditions set forth in Examples 2–4, the polymerization can be allowed to continue for a longer time, a redox system can be used, or a higher temperature can be employed. In any case the other conditions of the reaction, including the concentrations of the various reactants, would remain the same. If any of these changes were to be used in Examples 2–4, conversions of the order of 90% could be obtained.

The ratio of the monomers may be varied over a wide range in the preparation of the copolymers in accordance with this invention. While any ratio of monomers may be used, it is preferred to incorporate at least 1% but no more than about 90% by weight of vinyl ester of a chemically stabilized rosin acid in the copolymer. It is most preferred to incorporate from 50% to 99% by weight of vinyl chloride in the copolymer. With less than about 35% vinyl ester of a chemically stabilized rosin acid, the copolymer is similar in appearance and physical properties to pure polyvinyl chloride. It differs, however, in being slightly softer, and in its broader compatibility with plasticizers. (The above percentage figures are based on total monomer employed). Examples of plasticizers with which better compatibilty is exhibited are chlorinated paraffin, distilled methyl ester of tall oil, diethylene glycol dicaprate, and polymerized butyl acetylricinoleate. The copolymers of the invention also have improved flow characteristics over vinyl chloride homopolymers in semirigid plastic applications such as phonograph records. Further, the copolymers of the invention may be milled at temperatures as much as 50° to 70° F. lower than those needed to mill the homopolymer of polyvinyl chloride.

With increasing content of vinyl ester of a chemically stabilized rosin, the copolymer becomes increasingly soluble in a number of solvents. Thus, the 50% weight copolymer is soluble at 40% weight concentration in methyl ethyl ketone. The homopolymer of polyvinyl chloride is insoluble in such relatively cheap solvents as methyl ethyl ketone so that it is necessary to use such expensive solvents as cyclohexanone for the polyvinyl chloride.

The polymerization may be carried out in bulk, solution, suspension, or emulsion. Providing the content of the vinyl ester of chemically stabilized rosin in the copolymer is less than about 35% by weight, the copolymer is insoluble in the monomer mixture. Thus, in the bulk polymerization of such a copolymer, the copolymer precipitates as a fine powder which may be filtered from the reaction medium.

The catalysts for the reaction are those which produce free radicals. The catalysts may be organic or inorganic peroxides or other free radical producing compounds. Examples of suitable peroxides are benzoyl peroxide, lauroyl peroxide, di-tert-butyl peroxide, acetyl peroxide, cumene hydroperoxide, dicumyl peroxide, tert-butyl perphthalate, and potassium persulfate. Examples of other free radical producing compounds are $\alpha,\alpha'$-azobisisobutyronitrile and diazoaminobenzene. These catalysts may be used alone or with so-called activators which accelerate the decomposition of the free radical producing compound. The catalyst may be used in the concentrations of from about 0.01 to about 5% by weight. The preferred range for high conversion to soluble polymers is about 0.5 to about 1% by weight. This, of course, will vary somewhat with the efficiency of the catalyst. These catalysts, of course, require different temperatures for maximum effectiveness depending on their rate of decomposition. With benzoyl peroxide the range is 20° to 100° C. with 20° to 60° C. being the preferred range. The practical lower temperature for any catalyst is that at which a satisfactory rate of polymerization is obtained. This is a function of the catalyst or catalyst-activator system employed and changes as the science is advanced. The upper temperature limit of polymerization is the point at which the polymer decomposes which is about 130° C. Ultraviolet light is quite effective for initiating the polymerization. Activators such as acetone, biacetyl or di-tert-butyl peroxide which are split into free radicals by ultraviolet light may be used with it.

The vinyl esters of rosin acids of various degrees of hydrogenation can be used in accordance with this invention. In general, the vinyl esters of any of the prior art hydrogenated rosin acids may be employed. It is preferred, however, to employ the vinyl ester of a hydrogenated rosin acid which is at least 40% saturated with hydrogen and which hydrogenated rosin acid has a content of abietic-type resin acids of not over 10%. It is further preferred to use a rosin acid which is at least 80% saturated with hydrogen. A rosin acid which is at least 80% saturated with hydrogen has a content of abietic-type resin acids of substantially zero. The copolymer of the vinyl chloride with the vinyl ester of an at least 80% hydrogenated rosin acid may be prepared in substantial yield with as little as 0.5% by weight of such peroxide catalysts as benzoyl peroxide, whereas much stronger polymerization conditions are needed to obtain satisfactory yields when vinyl esters of less highly hydrogenated rosin acids are used. Also, copolymers of vinyl chloride and the vinyl ester of at least 80% hydrogenated rosin may be obtained which are colorless.

The per cent conversion to polymer and the drop softening point increase with increasing per cent of hydrogenation of the rosin acids. For these reasons it is most preferred to have the rosin as completely hydrogenated as it is commercially feasible to make it.

In describing the invention the term "rosin acid" has been employed. The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combined saponification and extraction processes, etc. It is well known, too, that the acidic fraction contained in wood or gum rosin is a mixture of isomeric resin acids which include abietic, levopimaric, dextropimaric, neoabietic, isodextropimaric, etc., acids. Such specific compounds are equivalent to the naturally occurring mixtures found in wood or gum rosin and the term "rosin acid" is intended to be inclusive thereof. However, from an economic standpoint, the naturally occurring wood or gum rosin or acid fractions thereof are preferred.

The hydrogenated rosin acids employed in accordance with this invention may be made by any of the known procedures for hydrogenating rosin acids. As examples thereof, there may be mentioned the procedures of U. S. 2,094,117 and U. S. 2,155,036. Other procedures which are of interest are those described in U. S. 2,174,651; U. S. 1,973,865; U. S. 2,113,808; and U. S. 2,346,793.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

A substantially completely hydrogenated rosin acid is rather unique in so far as this invention is concerned in that vinyl esters thereof copolymerize with ease to give very high conversions to polymers even in the presence of small amounts of relatively weak peroxide catalysts as benzoyl peroxide.

As stated above, it is preferred that the hydrogenated rosin acid employed have a content of abietic-type resin acids of not over 10%. By "abietic-type resin acids" there is meant the class of resin acids having the carbon skeleton of abietic acid; i. e.,

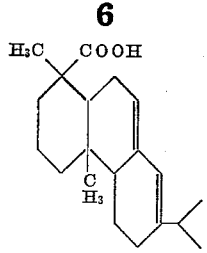

and having two ethylenic double bonds per molecule. Resin acids falling in this class are abietic acid, levopimaric acid and neoabietic acid.

The dehydrogenated rosin acids used in accordance with this invention may be prepared according to known procedures. As exemplary of known procedures of dehydrogenating rosin acids there is mentioned the heating of rosin acid for 1 to 2 hours at 150° C. to 200° C. with a dehydrogenation catalyst such as iodine or sulfur in the amount of 0.5 to 4% by weight of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and inter-molecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for 1 to 4 hours at 260° C. to 315° C. The pseudopimaric acid which is described in U. S. 2,072,628 is similarly suitable.

The above-described procedures for preparing dehydrogenated rosin acids provide products having a rather wide variety of degrees of dehydrogenation. It will be understood in this connection that the rosin acids present in wood and gum rosin are substantially entirely isomeric compounds possessing the empirical formula $C_{20}H_{30}O_2$. These isomers possess two ethylenic double bonds per molecule. Upon subjection to the known dehydrogenation processes a proportion of the isomeric acids lose two atoms of hydrogen and it is believed that the resulting three ethylenic bonds arrange themselves in the form of the most stable configuration, the benzene ring. Such acids have the empirical formula $C_{20}H_{28}O_2$ and are commonly referred to as "dehydroabietic acid." Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic content of at least 40% and having an abietic-type resin acid content of not over 10%. It is still further preferred to employ a dehydrogenated rosin acid having a content of abietic-type resin acids of substantially 0%.

Compared to copolymers prepared from vinyl chloride and the vinyl esters of rosin, the copolymers of the invention have better initial color, better color retention, greater ease of polymerization, higher solution viscosity and higher softening point. Compared to the homopolymer of vinyl chloride, the copolymers of the invention have greater compatibility with a wider range of plasticizers and better flow properties. As the content of vinyl ester of a chemically stabilized rosin is increased in the copolymer, the solubility of the copolymer in a wider variety of solvents shows a marked increase. The copolymers of the invention which contain a larger amount of the vinyl ester of a chemically stabilized rosin give tough resistant films and may be used for coatings where these properties are desirable. The copolymers having a high content of vinyl chloride are similar in uses to the homopolymer of vinyl chloride, but, due to the greater range of compatibility with plasticizers, a wider latitude of formulations such as a particular use or a cost advantage is possible. Better flow properties of the copolymers fit them for use in such applications as phonograph records.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspension of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalysts of the type described by Voorhees and Adams, J. A. C. S., 44, 1397 (1922) and by Adams and Shriner, J. A. C. S., 45, 2171 (1923), and (3) commercial hydrogen.

The apparatus employed included a gas measuring buret, a reaction flask, and a magnetic stirrer. The gas buret employed is that described by C. R. Noller and M. R. Barusch, Industrial & Engineering Chemistry, Anal. Ed., vol. 14, 907 (1942) with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10±0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15–0.20 g.) to the nearest 0.0001 g. into a 9 x 15 mm. sample cup. If the sample is a powdered solid, moisten with a drop of acetic acid. Place the sample up in the neck of the flask where it is supported by the end of the stopper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{\text{(Corrected initial volume—corrected final volume) } 0.00900}{\text{grams of sample}} = \% H_2 \text{ absorbed}$$

What I claim and desire to protect by Letters Patent is:

1. A copolymer of vinyl chloride and a vinyl ester of a chemically stabilized rosin acid, said chemically stabilized rosin acid being selected from the group consisting of hydrogenated rosin acids and dehydrogenated rosin acids and said chemically stabilized rosin acid containing not more than 10% of resin acids having the carbon skeleton of abietic acid and having two ethylenic double bonds per molecule.

2. The copolymer of claim 1 in which the vinyl ester of a chemically stabilized rosin acid is a vinyl ester of a hydrogenated rosin acid.

3. A copolymer of claim 1 in which the vinyl ester of a chemically stabilized rosin acid is a vinyl ester of a dehydrogenated rosin acid.

4. The copolymer of claim 2 in which the hydrogenated rosin acid is at least 80% hydrogenated and contains substantially no resin acids having the carbon skeleton of abietic acid and having two ethylenic double bonds per molecule.

5. The process for copolymerizing vinyl chloride and a vinyl ester of a chemically stabilized rosin acid, said chemically stabilized rosin acid being selected from the group of hydrogenated rosin acids and dehydrogenated rosin acids and containing not more than 10% of resin acids having the carbon skeleton of abietic acid and having two ethylenic double bonds per molecule, which comprises reacting both said vinyl compounds in the presence of a free radical producing catalyst.

6. The process of claim 5 in which the vinyl ester of a chemically stabilized rosin acid is a vinyl ester of a hydrogenated rosin acid.

7. The process of claim 5 in which the vinyl ester of a chemically stabilized rosin acid is a vinyl ester of a dehydrogenated rosin acid.

8. The process of claim 6 in which said hydrogenated rosin acid is at least 80% saturated and contains substantially no resin acids having the carbon skeleton of abietic acid and having two ethylenic double bonds per molecule.

9. The process of claim 8 in which the free radical producing catalyst is a peroxide polymerization catalyst.

10. The process of claim 8 in which said compounds are subjected to ultraviolet radiation.

11. The process of claim 8 in which said compounds are subjected to ultraviolet radiation in the presence of an activator selected from the group consisting of acetone, biacetyl and di-tert-butyl peroxide.

12. The process of claim 8 in which the free radical producing compound is selected from the group consisting of $\alpha,\alpha'$-azobisisobutyronitrile and diazoaminobenzene.

References Cited in the file of this patent

UNITED STATES PATENTS

| | | |
|---|---|---|
| 2,118,864 | Reppe | May 31, 1938 |
| 2,614,997 | Robinson | Oct. 21, 1952 |
| 2,639,273 | Gould | May 19, 1953 |

FOREIGN PATENTS

| | | |
|---|---|---|
| 395,478 | Great Britain | July 20, 1933 |

OTHER REFERENCES

Fleck et al.: J. Am. Chem. Soc., 61, 1230–1232 (May 1939.)